US012666301B2

(12) United States Patent
Salkintzis et al.

(10) Patent No.: US 12,666,301 B2
(45) Date of Patent: Jun. 23, 2026

(54) MODIFYING A FIRST DATA CONNECTION TO SUPPORT DATA TRAFFIC OF A SECOND DATA CONNECTION

(71) Applicant: Lenovo (Singapore) Pte. Ltd., New Tech Park (SG)

(72) Inventors: Apostolis Salkintzis, Athens (GR); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 18/553,725

(22) PCT Filed: Mar. 31, 2021

(86) PCT No.: PCT/EP2021/058406
§ 371 (c)(1),
(2) Date: Oct. 2, 2023

(87) PCT Pub. No.: WO2022/207089
PCT Pub. Date: Oct. 6, 2022

(65) Prior Publication Data
US 2024/0187918 A1     Jun. 6, 2024

(51) Int. Cl.
*H04W 28/02*      (2009.01)
*H04W 12/0471*      (2021.01)

(52) U.S. Cl.
CPC ...  *H04W 28/0268* (2013.01); *H04W 12/0471* (2021.01)

(58) Field of Classification Search
None
See application file for complete search history.

(56) References Cited

U.S. PATENT DOCUMENTS

2020/0344769 A1    10/2020  Salkintzis et al.
2021/0289391 A1*    9/2021  Paladugu .............. H04W 88/04
(Continued)

FOREIGN PATENT DOCUMENTS

KR      20200003819 A     1/2020
WO       2018206080 A1    11/2018
WO       2021052573 A1     3/2021

OTHER PUBLICATIONS

Talebi Fard—U.S. Appl. No. 63/167,839 Provisional (filed Mar. 30, 2021) (Year: 2021).*
(Continued)

*Primary Examiner* — Andre Tacdiran
(74) *Attorney, Agent, or Firm* — Kunzler Needham Hilton

(57)      ABSTRACT

Apparatuses, methods, and systems are disclosed for modifying a first data connection during the establishment of a second data connection. One apparatus includes a processor and a transceiver that receives a first request via a first data connection with a first mobile network, the first request containing a first set of parameters for establishing a second data connection with an interworking function in a second mobile network. Via the transceiver, the processor sends a second request to modify the first data connection, the second request containing a second set of parameters for modifying the first data connection to support the data traffic of the second data connection and transmits the data traffic of the second data connection through the modified first data connection.

16 Claims, 11 Drawing Sheets

(56) References Cited

U.S. PATENT DOCUMENTS

| | | | | |
|---|---|---|---|---|
| 2021/0410001 A1* | 12/2021 | Shi | | H04W 28/0263 |
| 2022/0174546 A1* | 6/2022 | Li | | H04L 67/141 |
| 2022/0322202 A1* | 10/2022 | Li | | H04M 15/93 |
| 2022/0330195 A1* | 10/2022 | Chen | | H04W 68/12 |
| 2023/0094211 A1* | 3/2023 | Kim | | H04W 36/00698 |
| | | | | 370/331 |
| 2023/0105896 A1* | 4/2023 | Bienas | | H04W 28/0268 |
| | | | | 370/235 |
| 2023/0209431 A1* | 6/2023 | Youn | | H04W 8/082 |
| | | | | 455/432.1 |
| 2024/0022952 A1* | 1/2024 | Talebi Fard | | H04W 72/543 |

OTHER PUBLICATIONS

PCT/EP2021/058406, "International Search Report and the Written Opinion of the International Searching Authority, or the Declaration", International Searching Authority, Dec. 22, 2021, pp. 1-17.

3GPP, "3rd Generation Partnership Project; Technical Specification Group Services and System Aspects; Study on access traffic steering, switch and splitting support in the 5G system architecture (Release 16)", 3GPP TR 23.793 V16.0.0, Dec. 2018, pp. 1-114.
3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.
Nokia et al., "KI#2, New Sol: Solution for offering QoS—simultaneous access to services by PLMN and SNPN", SA WG2 Meeting #140E S2-200xxxx, S2-2005728, Jun. 1-12, 2020, pp. 1-7.
CATT, "KI #3, Sol #45: Update to remove ENs and add clarifications", SA WG2 Meeting #141E e-meeting S2-2008293, Oct. 12-Oct. 23, 2020, pp. 1-5.

* cited by examiner

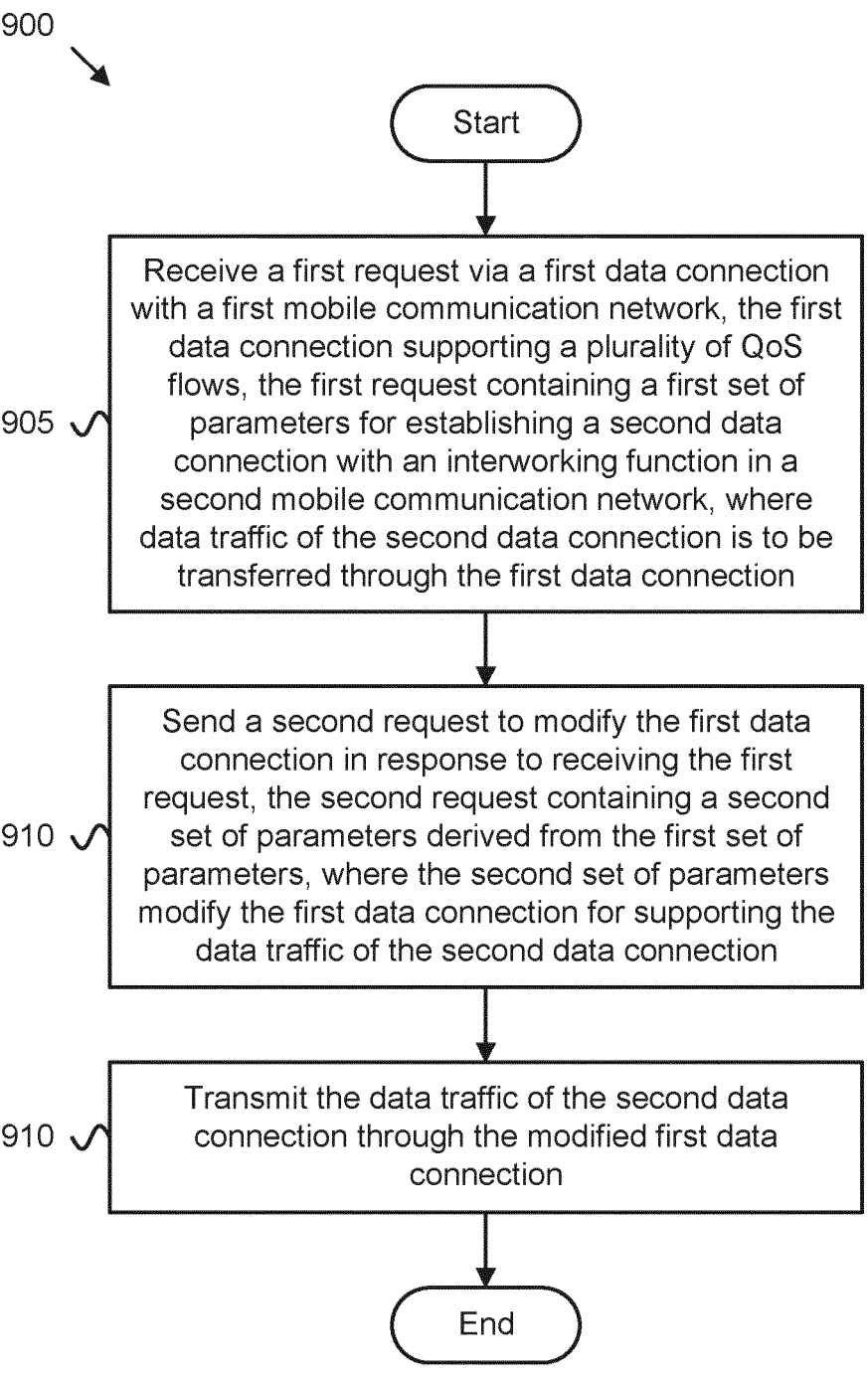

900

Start

905 Receive a first request via a first data connection with a first mobile communication network, the first data connection supporting a plurality of QoS flows, the first request containing a first set of parameters for establishing a second data connection with an interworking function in a second mobile communication network, where data traffic of the second data connection is to be transferred through the first data connection 910 Send a second request to modify the first data connection in response to receiving the first request, the second request containing a second set of parameters derived from the first set of parameters, where the second set of parameters modify the first data connection for supporting the data traffic of the second data connection 910 Transmit the data traffic of the second data connection through the modified first data connection End

FIG. 9

MODIFYING A FIRST DATA CONNECTION TO SUPPORT DATA TRAFFIC OF A SECOND DATA CONNECTION

FIELD

The subject matter disclosed herein relates generally to wireless communications and more particularly relates to modifying a first data connection to support the data traffic of a second data connection.

BACKGROUND

In certain wireless communication systems, a User Equipment device ("UE") is able to connect with a fifth-generation ("5G") core network (i.e., "5GC") in a Public Land Mobile Network ("PLMN") or to connect with a 5GC in a Non-Public Network ("NPN"). In addition, a UE may be enabled to connect to a 5GC in a PLMN (second core network) via a 5GC in an NPN (first core network), and vice versa. However, the connection to the second core network via the first core network may be transparent to the first network. Therefore, the first core network is unaware of Quality of Service ("QoS") requirements of the connection to the second core network via the first core network.

BRIEF SUMMARY

Disclosed are procedures for modifying a first data connection during the establishment of a second data connection. Said procedures may be implemented by apparatus, systems, methods, and/or computer program products.

One method of a User Equipment device ("UE") includes receiving a first request via a first data connection with a first mobile communication network, the first data connection supporting a plurality of QoS flows. Here, the first request containing a first set of parameters for establishing a second data connection with an interworking function in a second mobile communication network, where data traffic of the second data connection is to be transferred through the first data connection. The first method includes sending a second request to modify the first data connection in response to receiving the first request. Here, the second request containing a second set of parameters derived from the first set of parameters, where the second set of parameters modify the first data connection for supporting the data traffic of the second data connection. The first method includes transmitting the data traffic of the second data connection through the modified first data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram illustrating one embodiment of a wireless communication system for modifying a first data connection during the establishment of a second data connection;

FIG. 5A is a signal flow diagram illustrating one embodiment of a procedure for modifying a first data connection during the establishment of a second data connection;

FIG. 9 is a flowchart diagram illustrating one embodiment of a method for modifying a first data connection during the establishment of a second data connection.

DETAILED DESCRIPTION

Figure 2:
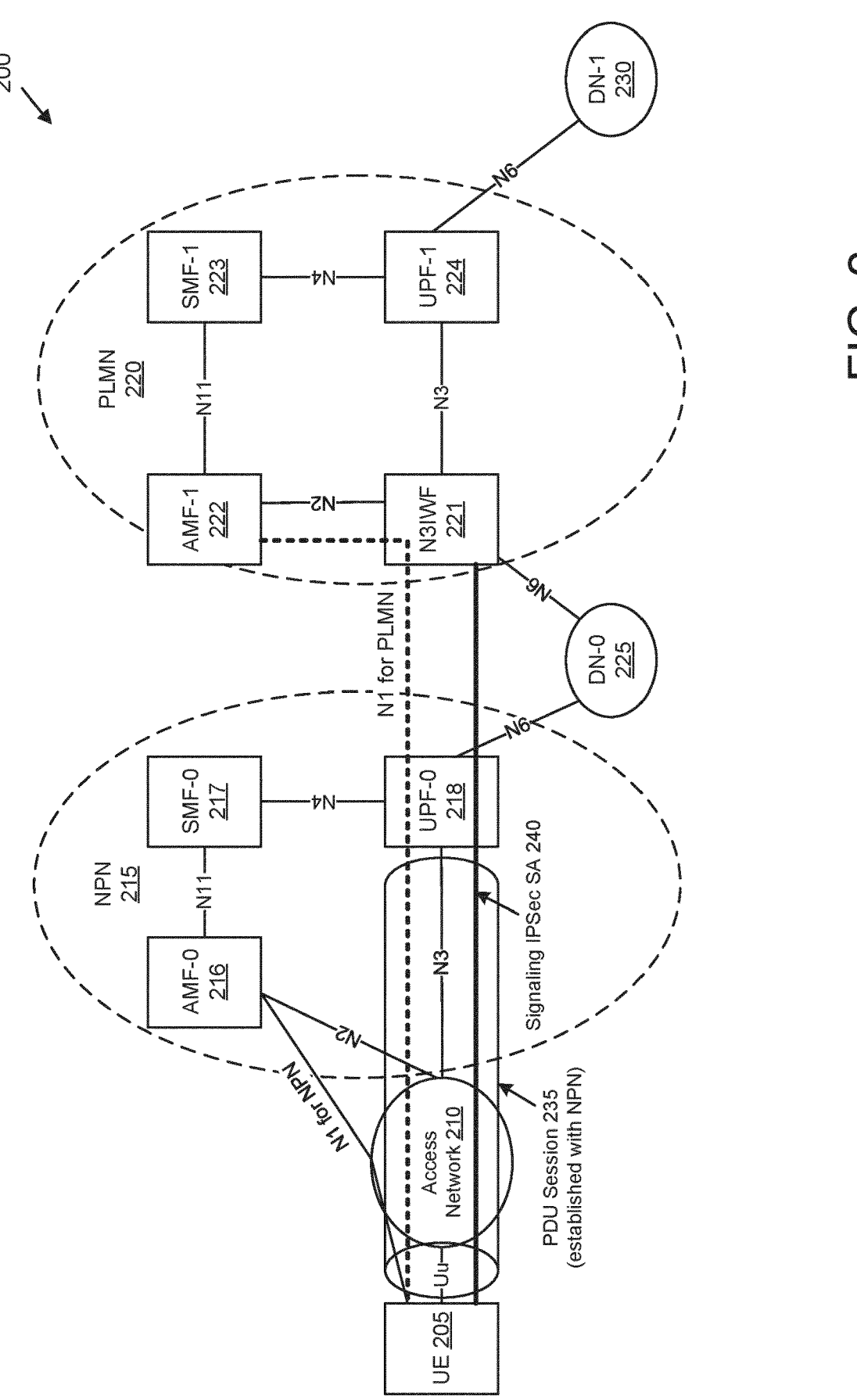
FIG. 2 is a diagram illustrating one embodiment of a network deployment for supporting access to Public Land Mobile Network ("PLMN") services via a Non-Public Network ("NPN")

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for modifying a first data connection during the establishment of a second data connection. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The present disclosure described how the second PDU Session can support data communication with certain QoS given that all data traffic goes through the first PDU Session, which is unaware of the QoS requirements of the second PDU Session.

Disclosed herein are solutions to enable the UE to modify a first PDU Session with a first 5G core network (e.g., NPN) when the UE attempts to establish a second PDU Session with a second 5G core network (e.g., PLMN), so that the first PDU Session is capable of transferring the one or more Internet Protocol Security ("IPsec") child Security Associations ("SAs") of the second PDU Session by providing the necessary QoS handling.

Figure 1:
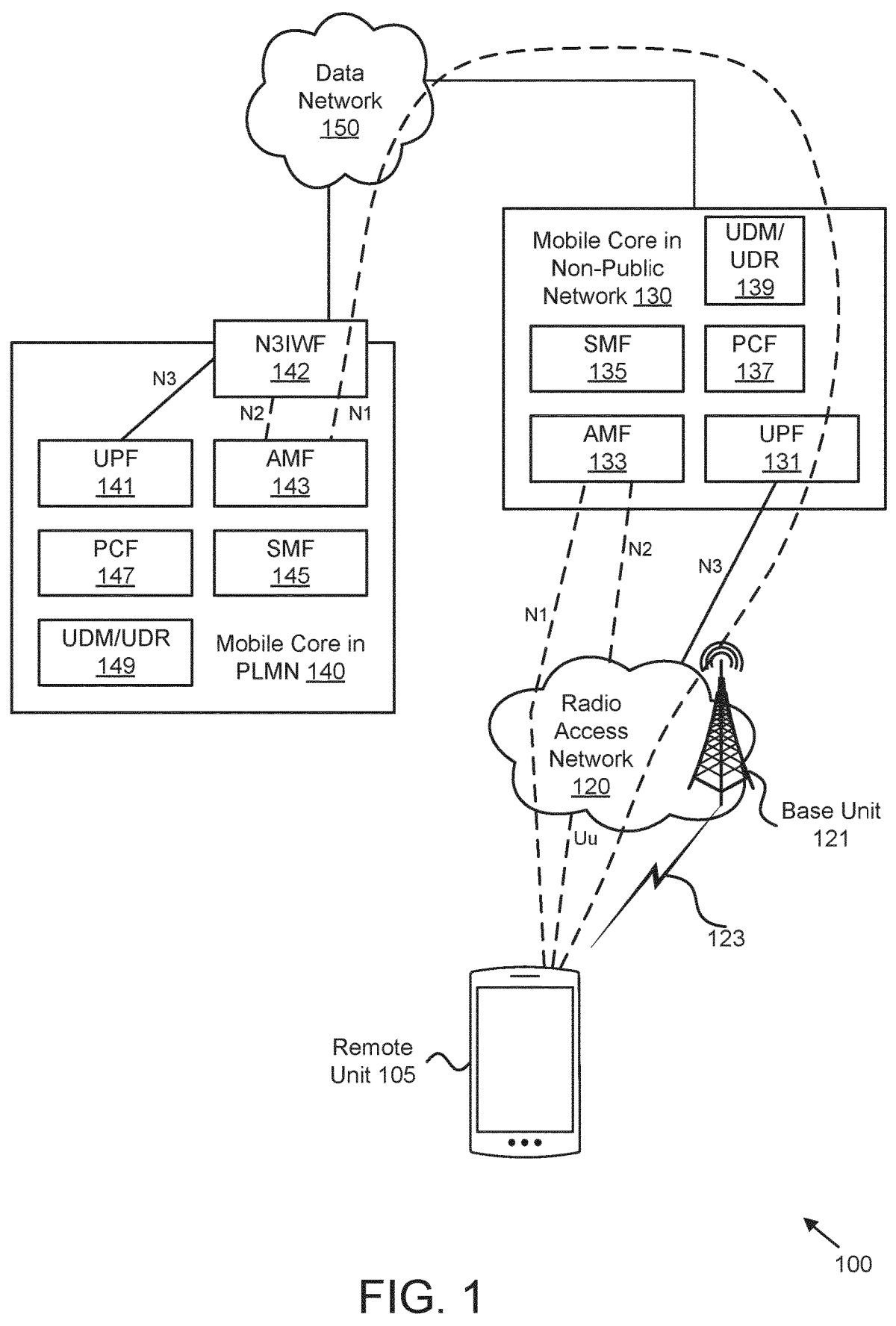

FIG. 1 depicts a wireless communication system 100 for modifying a first data connection during the establishment of a second data connection, according to embodiments of the disclosure. In one embodiment, the wireless communication system 100 includes at least one remote unit 105, a radio access network ("RAN") 120, a first mobile core network 130, e.g., in a non-public network (i.e., private network), and a second mobile core network 140, e.g., in a public network. The RAN 120 and the mobile core network 130 form a mobile communication network. The RAN 120 may be composed of a base unit 121 with which the remote unit 105 communicates using wireless communication links 123. While the RAN 120 is depicted as connecting to only the mobile core network 130 in the non-public network, in other embodiments the RAN 120 may connect to only the mobile core network 140 in the public network.

Even though a specific number of remote units 105, base units 121, wireless communication links 123, RANs 120, and mobile core networks 130, 140 are depicted in FIG. 1, one of skill in the art will recognize that any number of remote units 105, base units 121, wireless communication links 123, RANs 120, and mobile core networks 130, 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 151 in the packet data network 150 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core networks 130 and 140 are 5GC or an Evolved Packet Core ("EPC") networks, which may be coupled to a packet data network 150, like the Internet and private data networks, among other data networks. A remote unit 105 may have a subscription or other account with the non-public mobile core network 130.

Additionally, the remote unit 105 may have a subscription or other account with the public mobile core network 140. In various embodiments, each mobile core network 130, 140 belongs to a single mobile network operator ("MNO"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, a Unified Data Management function ("UDM") and a User Data Repository ("UDR").

The UPF(s) 131 is responsible for packet routing and forwarding, packet inspection, QoS handling, and external PDU session for interconnecting Data Network (DN), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The PCF 137 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), or other NFs defined for the 5GC. In certain embodiments, the mobile core network 130 may include an authentication, authorization, and accounting ("AAA") server.

The public mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. The roles of the UPF 141, AMF 143, SMF 145, PCF 147 and UDM/UDR 149 are the same as those described above with reference to the UPF 131, AMF 133, SMF 135, PCF 137 and UDM/UDR 139. In various embodiments, the mobile core network 140 may also include an Authentication Server Function ("AUSF"), a Network Repository Function ("NRF"), or other NFs defined for the 5GC. In certain embodiments, the mobile core network 140 may include an authentication, authorization, and accounting ("AAA") server.

In various embodiments, the each of the mobile core networks 130 and 140 supports different types of mobile data connections and different types of network slices, wherein each mobile data connection utilizes a specific network slice. Here, a "network slice" refers to a portion of a core network optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 135/145 and UPF 131/141. In some embodiments, the different network slices may share some common network functions, such as the AMF 133/143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core networks 130 and 140. While depicted as a mobile core in a non-public network, in other embodiments the mobile core 130 may be a mobile core is a separate PLMN than the mobile core network 140. In such embodiments, the remote unit 105 may establish a data connection with the mobile core network 130 to register with the mobile core network 140 via the Non-3GPP Interworking Function ("N3IWF") 142.

The N3IWF 142 is a network function that supports access to a 5GC via non-3GPP access networks. In general, the N3IWF 142 supports connectivity to one or more 5GC networks for UEs which support the NAS protocol over non-3GPP access and the applicable NAS procedures. Here, the N3IWF 142 is also being used to support access of the remote unit 105 to the mobile core network 140 via another mobile network, here the non-public mobile core network 130.

While FIG. 1 depicts components of a 5G RAN and a 5G core network, the described embodiments for modifying a first data connection during the establishment of a second data connection apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 130 and/or the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF may be mapped to an MME, the SMF may be mapped to a control plane portion of a PGW and/or to an MME, the UPF may be mapped to an SGW and a user plane portion of the PGW, the UDM/UDR may be mapped to an HSS, etc.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems modifying a first data connection during the establishment of a second data connection.

To solve the problem of appropriate QoS handling for a second PDU Session whose traffic goes through the first PDU Session, described above, the present disclosure proposes solutions that enables a UE (e.g., the remote unit 105) that has established a first data connection with a first mobile network (i.e., mobile core 130 in NPN), the first data connection having a first set of QoS characteristics, to establish a second data connection with a second mobile network (i.e., mobile core 140 in PLMN), the second data connection having a second set of QoS characteristics, wherein the traffic of the second data connection is transferred via the first data connection, and wherein the second data connection is established after modifying the first data connection to support the second QoS characteristics.

FIG. 2 depicts a network deployment 200 comprising a UE 205 which registers with a non-public network ("NPN") 215. In one embodiment, the NPN 215 may be a standalone NPN ("SNPN"), i.e., having its own network function and not relying on network functions provided by a PLMN. In another embodiment, the NPN 215 may be a public network integrated NPN ("PNI-NPN"), i.e., a non-public network deployed with the support of a PLMN. The NPN 215 includes at least an AMF ("AMF-0") 216, a SMF ("SMF-0") 217, and a UPF ("UPF-0") 218. In various embodiments, the NPN 215 includes additional NFs as described above with reference to FIG. 1. Note that the UE 205 connects to the NPN 215 via an Access Network 210.

As depicted, the UE 205 is simultaneously connected to two 5G core networks: a first 5GC in the NPN 215 and a second 5GC in the PLMN 220. After the UE 205 registers with the first 5GC in the NPN 215, it can access a second 5GC in the PLMN 220 as follows;

First, the UE 205 establishes an IP-type PDU Session 235 with the first 5GC in the NPN according to the existing procedures and, thus, obtains IP connectivity. This is the first PDU Session of the UE 205 and (as any other PDU Session) is composed of one or more QoS flows, each one carrying the data traffic of the PDU Session with certain QoS requirements. Through the first PDU Session, the UE 205 obtains connectivity to the Data Network 0 (DN-0) 225. As depicted, the NPN 215 and the PLMN 220 are connected via a data network ("DN-0") 225.

When the UE 225 decides to connect to the PLMN 220, the UE 205 discovers the IP address of an N3IWF 221 in this PLMN 220 (e.g., by performing DNS procedures via the first PDU Session) and establishes a signaling IPsec SA 240 with the N3IWF 221. The UE 205 then registers to this PLMN 220 by performing an existing procedure for 5G registration via the N3IWF 221 or, equivalently, for 5G registration via untrusted non-3GPP access. This registration procedure is conducted by exchanging NAS messages between the UE 205 and AMF-1 222 via the N3IWF 221 and via the first PDU Session 235 of the UE 205 (i.e., via the UPF-0 218 in the NPN 215 and via the Access Network 210). As depicted, the PLMN 220 includes at least the N3IWF 221, an AMF ("AMF-1") 222, a SMF ("SMF-1") 223, and a UPF ("UPF-1") 224. In various embodiments, the PLMN 220 includes additional NFs as described above with reference to FIG. 1.

After registering with the PLMN 220 via the N3IWF 221 and via the first PDU Session 235, the UE 205 requests to establish a (second) PDU Session with the PLMN 220, which provides connectivity to the Data Network 1 (DN-1) 230. This is the second PDU Session of the UE 205 and all data traffic of this second PDU Session is transported over the first PDU Session 235. It is important to note that the second PDU Session with the PLMN 220 is established completely transparently to the NPN 215. In other words, the NPN 215 cannot determine if and when the UE 205 establishes the second PDU Session because all NAS messages exchanged between the UE 205 and AMF-1 222 to establish this PDU Session are transmitted as encrypted data packets via the first PDU Session.

Moreover, after registering with the PLMN 220, the UE 205 has an N1 connection with the AMF-0 216 for the NPN and also an N1 connection with the AMF-1 222 for the PLMN. After establishing a second PDU session with the PLMN CN 220, the UE 205 may access another data network ("DN-1") 230 via the UPF-1 224.

In one example, the second PDU Session might be set up by the UE 205 in order to access real-time voice services in the PLMN 220. Therefore, the voice traffic over the second PDU Session is to be transmitted with appropriate QoS handling so that the delay and the loss rate do not exceed certain bounds. As noted above, the second PDU Session is established transparently to the NPN and, thus, the QoS flows supported by the first PDU Session 235 do not take into account the QoS requirements of the second PDU Session. Therefore, the solutions disclosed herein enable the UE 205 to modify the PDU session 235 to provide appropriate QoS handling to the voice traffic of the second PDU Session, e.g., in order to support QoS for real-time voice traffic.

Figure 3:
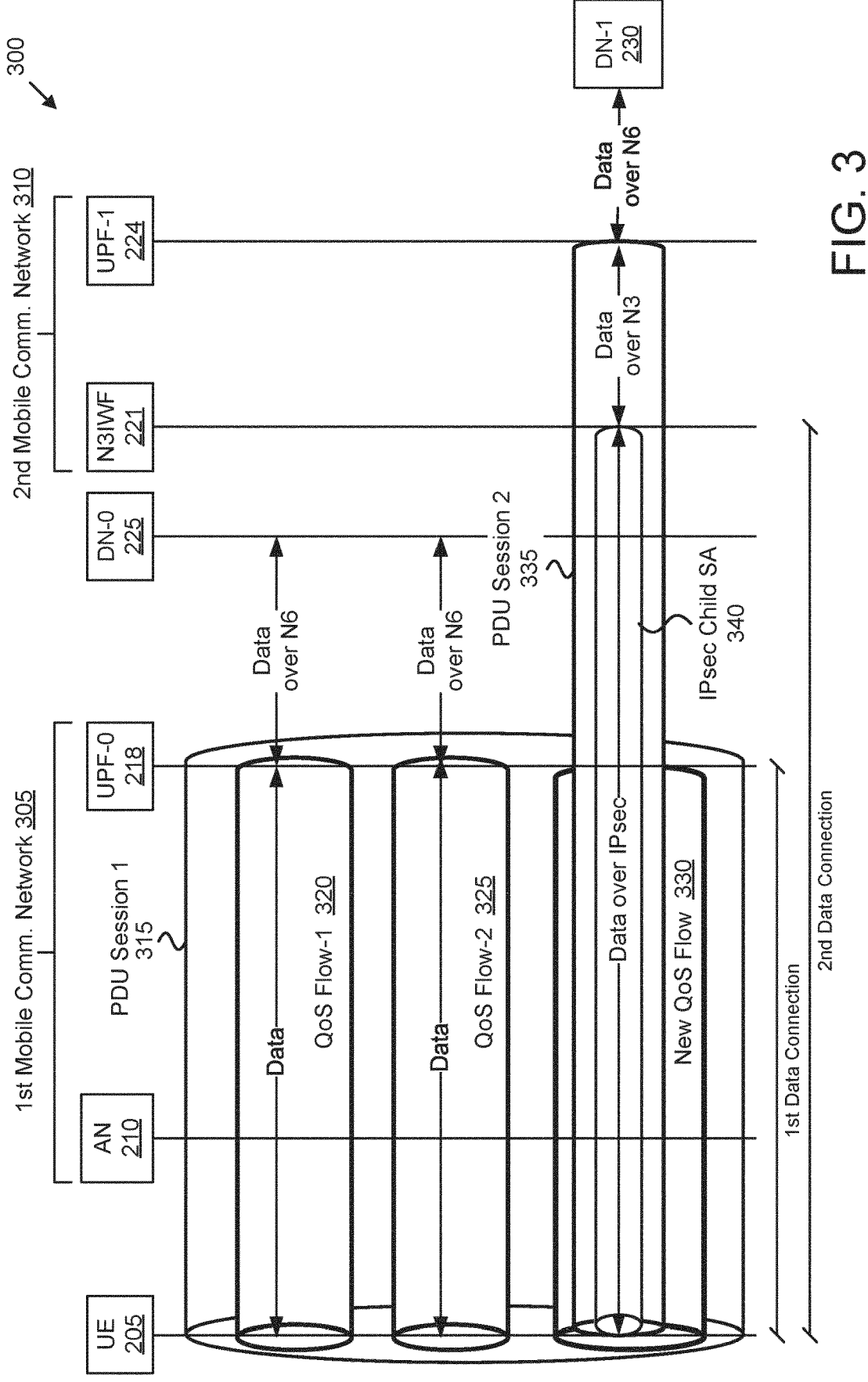
FIG. 3 is a diagram illustrating one embodiment of a scenario for modifying a first data connection during the establishment of a second data connection.

FIG. 3 depicts a network architecture 300 showing user-plane traffic, according to embodiments of the disclosure. The network architecture 300 includes a UE 205 which is registered with a first mobile communication network 305. In various embodiments, the first mobile communication network 305 is a non-public network, such as the mobile core network 130 and/or the NPN 215.

In the scenario of FIG. 3, the UE 205 has established a first PDU Session 315 with the first mobile communication network 305 (i.e., PDU Session 1) having two QoS flows for communicating with Data Network-0 225, e.g., the Internet. All data packets in the first PDU Session 315 are transmitted over one of these two QoS flows (QoS Flow-1 320 and QoS Flow-2 325), each one offering different QoS characteristics.

The UE 205 may be configured with QoS rules that map the uplink data traffic of the UE 205 to one of these QoS flows. Similarly, the UPF-0 218 may be configured with N4 rules that map the downlink data traffic of the UE 205 to one of these QoS flows. The first PDU Session 315 is anchored at the UPF-0 218. As depicted in FIG. 2, data between UPF-0 and the DN-0 225 is over the N6 interface.

Again referencing FIG. 3, the UE 205 registers with the 5GC in the second mobile communication network 310 in via the first PDU session 315 and establishes a second PDU Session ("PDU Session 2") 335 for communicating with Data Network-1 230, e.g., an enterprise network. Here, the second PDU Session 335 is anchored at UPF-1 224. Note that traffic of the second PDU session 335 goes through a gateway or an interworking function, depicted here as the N3IWF 221, in the second mobile communication network 310. Note that the second mobile communication network 310 may be a public network, such as the mobile core network 140 and/or the PLMN 220.

After the establishment of the second PDU Session (PDU Session 2) 335 with the second mobile communication network 310 (e.g., PLMN), an IPsec child SA 340 is established between the UE 205 and the N3IWF 221 and all data traffic of the second PDU Session 335 is transported over this child SA, which establishment is described in greater detail with reference to FIGS. 5A-5C. In one embodiment, the traffic of the IPsec child SA is transferred via one of the existing QoS flows of the first PDU Session. However, as aforementioned, it is possible for the first PDU Session to have no QoS flows suitable to provide the QoS required by the IPsec child SA of the second PDU Session.

If an established QoS flow supports the appropriate QoS for the second PDU session 335, then the UE 205 modifies the first PDU session 315 by indicating the existing QoS flow suitable to carry the data traffic of the second PDU session 335 and provides packet filters identifying the data traffic of the second PDU session 335. Examples of such packet filters include an IP address of the N3IWF 221 and security parameter index ("SPI") assigned by the N3IWF 221.

If no established QoS flow for the first PDU session 315 supports the appropriate QoS for the second PDU session 335, then the UE 205 modifies the first PDU session 315 by creating a new QoS flow 255 that will carry the IPsec traffic of the second PDU session 335 and maps the IPsec traffic of the second PDU session 335 onto this new QoS flow 255. In this way, the IPsec traffic of the second PDU session 335 receives the appropriate QoS handling when going through the first PDU Session 315. In the depicted example, it is assumed that a new QoS flow 330 is created to support the QoS requirements of the second PDU session 335.

Note that in FIG. 3, the first data connection corresponds to the first PDU Session 315 and the second data connection corresponds to the IPsec child SA 340 between the UE and N3IWF (not to the second PDU Session). While the depicted embodiment shows only one IPsec child SA 340, in other embodiments the second PDU Session 335 may have multiple IPsec child SAs, each one dedicated to carrying the traffic with similar QoS requirements.

In the general case, where the second PDU Session 335 is composed of multiple IPsec SAs, then the UE 205 may establish a new QoS flow for every IPsec SA. Alternatively, the UE 205 may establish a new QoS for some IPsec SAs and map the other IPsec SAs into existing QoS flows. For case of illustration, only a single IPsec SA 340 is shown in FIG. 3.

Figure 4:
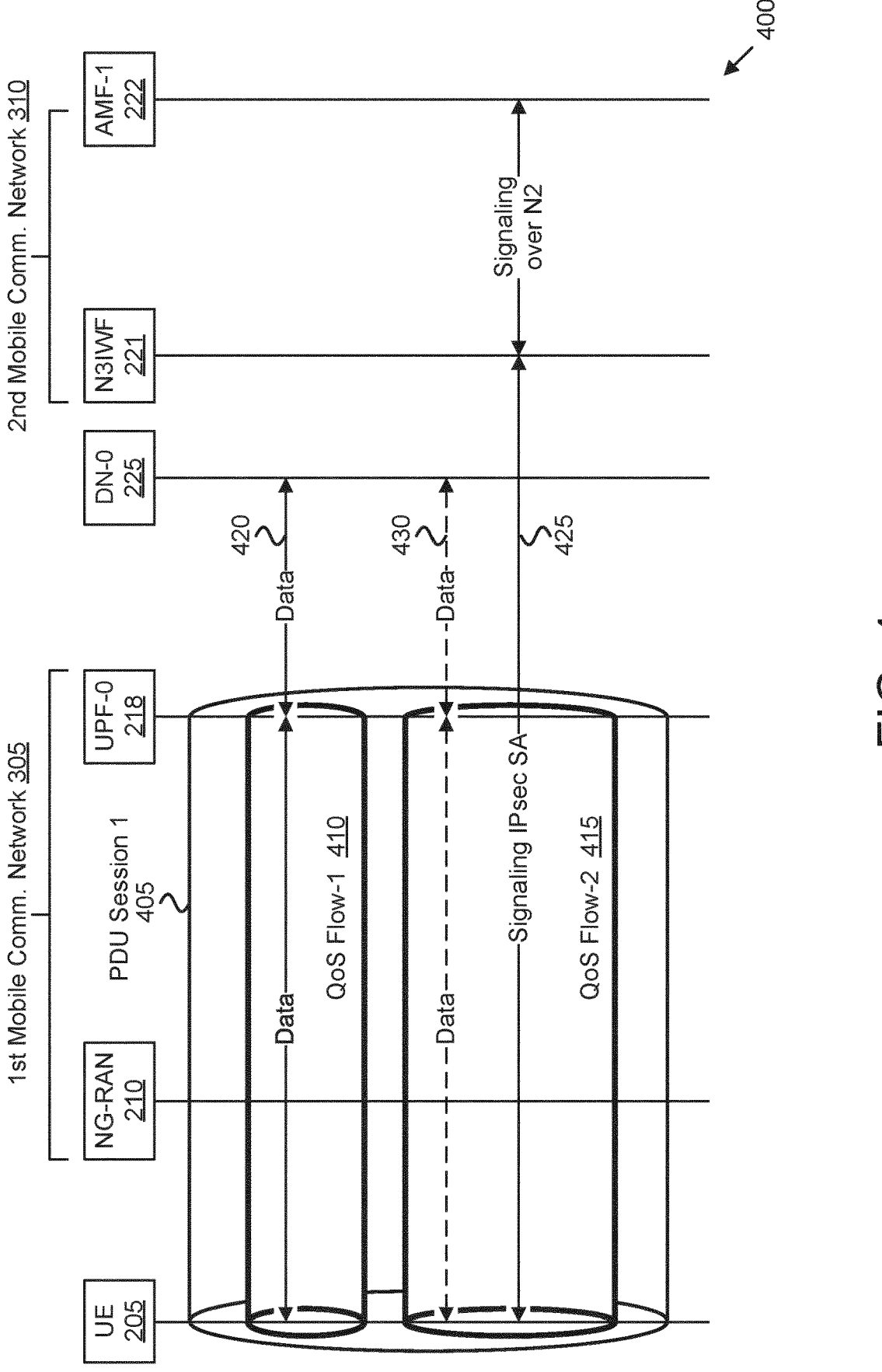
FIG. 4 is a diagram illustrating one embodiment of a first data connection.

FIG. 4 depicts a scenario 400 where the UE 205 has established a first data connection 405 (i.e., PDU Session 1) with the first mobile communication network 305. In the depicted example, the first data connection includes two QoS flows: a first QoS flow ("QoS Flow-1") 410 and a second QoS flow ("QoS Flow-2") 415; however, in other embodiments the first data connection may be established with more or fewer QoS flows. The first QoS flow 410 is used to transfer data having first QoS requirements, while the second QoS flow 415 may be used to transfer data traffic 420 having different QoS requirements. Notably, the second QoS flow 415 is used to establish a signaling Internet Protocol Security ("IPsec") security association ("SA") 425 with the N3IWF 221 via the DN-0 225. The signaling IPsec SA 425 established here may be an implementation of the signaling IPsec SA 240, described above. In certain embodiments, the second QoS flow 415 may carry other data traffic 430 to the DN-0 225, i.e., having the same QoS requirements and the signaling IPsec SA 425. Note that the N3IWF 221 in the second mobile communication network 310 terminates the signaling IPsec SA 425 and uses an N2 connection established with the AMF-1 222 to carry signaling traffic from the UE 205 to the AMF-1 222.

Figure 5A:
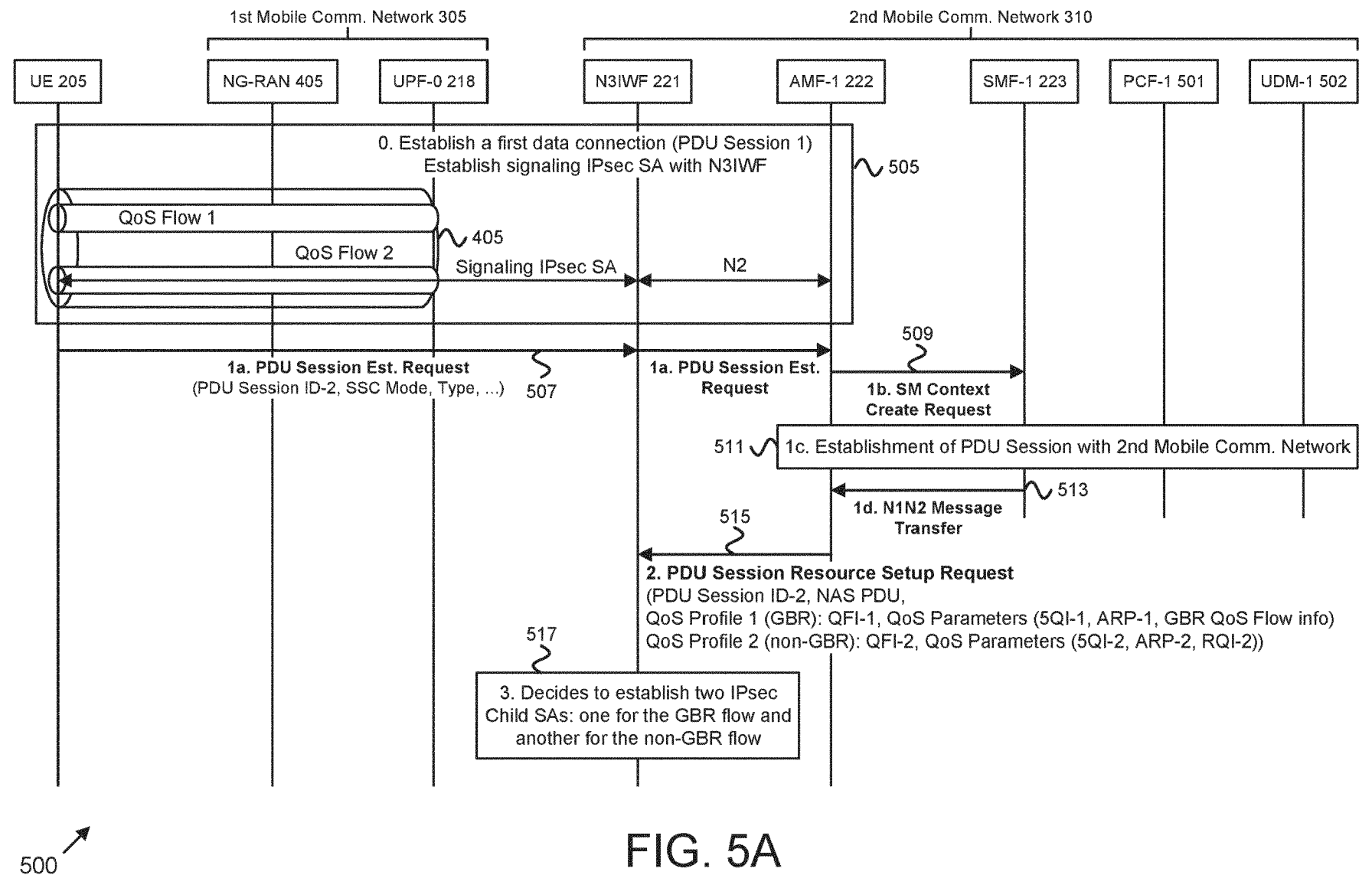
Figure 5B:
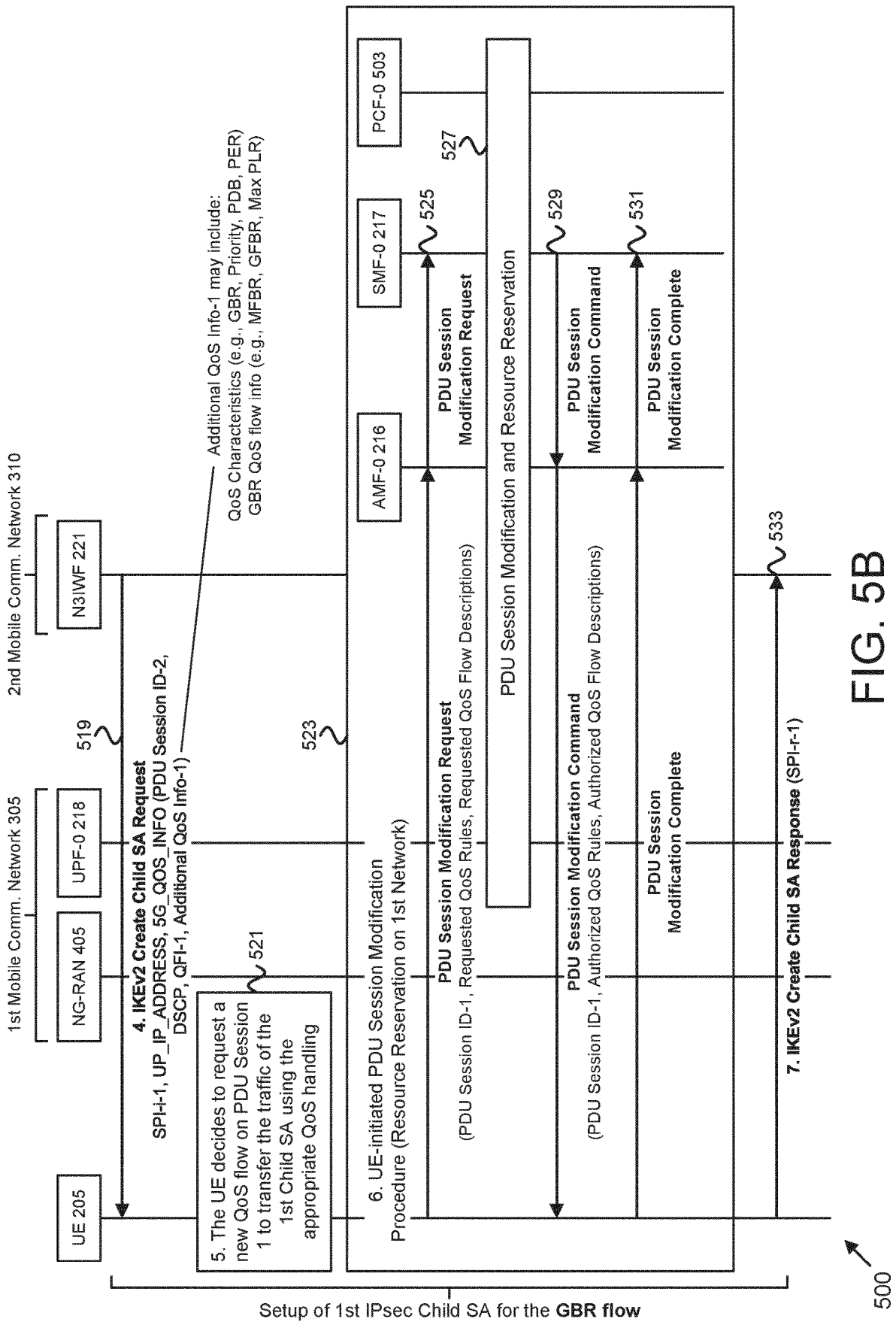
FIG. 5B is a continuation of the procedure depicted in FIG. 5A.
Figure 5C:
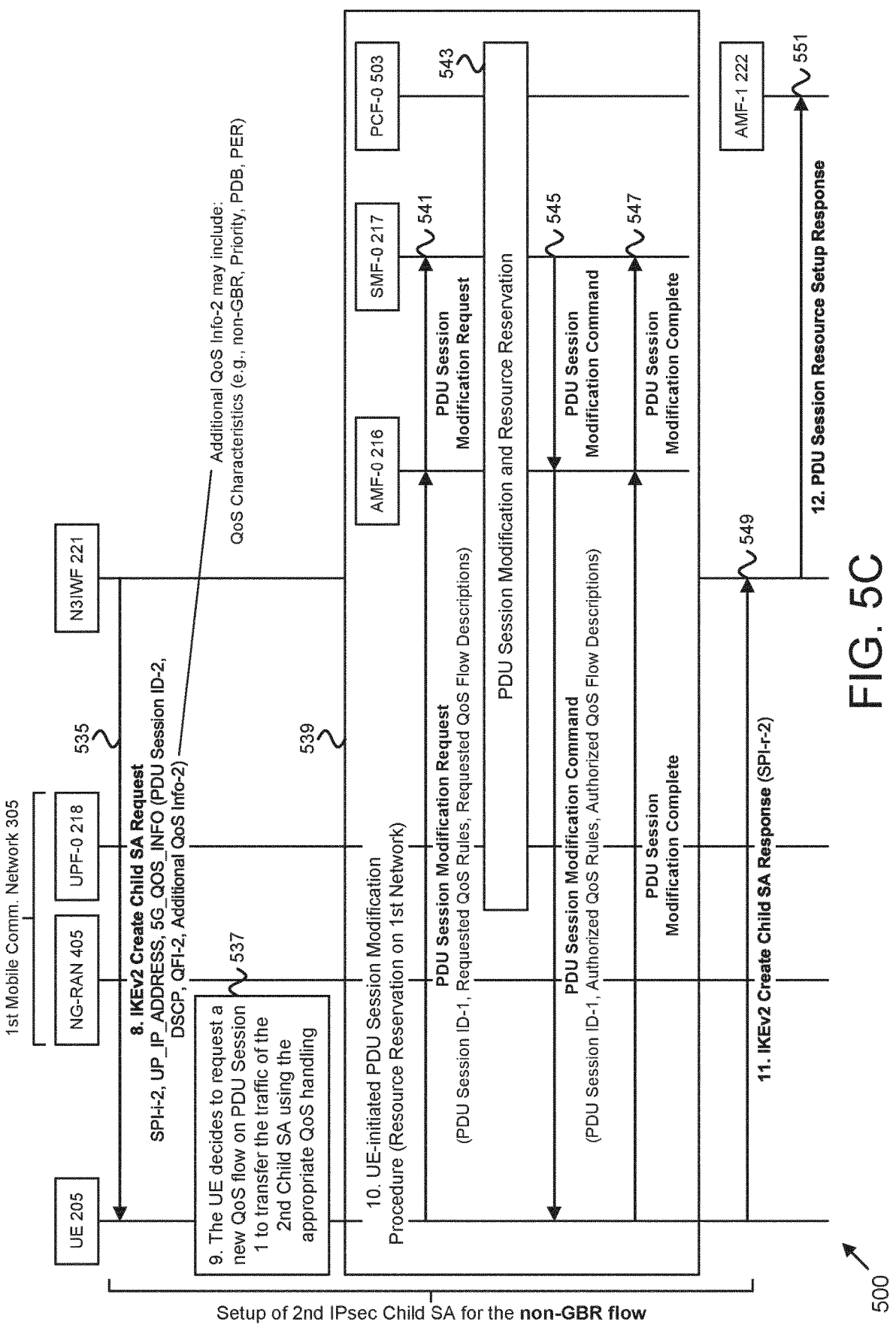
FIG. 5C is a continuation of the procedure depicted in FIGS. 5A-5B.

FIGS. 5A-5C depict a procedure 500 for registering with a mobile network through another mobile network, according to embodiments of the disclosure. The procedure 500 involves the UE 205, a Next Generation RAN ("NG-RAN") 405, an AMF, SMF, UPF and PCF in a first mobile communication network 305 (i.e., the AMF-0 216, the SMF-0 217, the UPF-0 218 and a "PCF-0" 503), and a N3IWF, AMF, SMF, UPF, PCF and UDM in a second mobile communication network 310 (i.e., the N3IWF 221, the AMF-1 222, the SMF-1 223, the UPF-1 224, a "PCF-1" 501 and a "UDM-1" 502, respectively).

The procedure 500 enables the UE 205 to modify a first PDU Session with a first mobile communication network 305 (e.g., NPN) when the UE 205 attempts to establish a second PDU Session with a second mobile communication network 310 (e.g., PLMN), so that the first PDU Session is capable of transferring the one or more IPsec child SAs of the second PDU Session by providing the necessary QoS handling. While the procedure 500 assumes that the first mobile communication network 305 is an NPN and the second mobile communication network 310 is a PLMN, in an alternative embodiment, the roles of the NPN and the PLMN can be interchanged. In other words, it is also possible the apply the principles and the procedure described below in a scenario where the UE 205 is connected to a PLMN (consisting of NG-RAN access and 5GC core network) and uses a PDU Session via the PLMN to connect to an NPN consisting of at least a 5G core network by using a N3IWF in the NPN. This scenario is beneficial in case when the NPN coverage is limited and the UE 205 can use the PLMN to access the NPN services when the UE 205 is outside the NPN coverage.

At FIG. 5A, the procedure 500 begins at Step 0 where, as a precondition, the UE 205 has registered with the 5GC in the first mobile communication network 305 (e.g., NPN) and has established the first PDU Session 405 that is composed of two QoS flows (see block 505). Also, the UE 205 has registered with the, e.g., 5GC in the second mobile communication network 310 via the N3IWF 221 and, thus, has established the so-called "signaling IPsec SA" with the N3IWF 221, via which all Non-Access Stratum ("NAS") messages between the UE 205 and AMF-1 222 are exchanged. Note that all these NAS messages are encrypted and cannot be inspected by UPF-0 218 or another network function in first mobile communication network 305.

At Step 1a, the UE 205 sends a NAS message (e.g., PDU Session Establishment Request) in order to establish the second PDU Session with the second mobile communication network 310. This NAS message is transferred via the Signaling IPsec SA 425 to the N3IWF 221 and is then forwarded to AMF-1 222 (sec messaging 507). The PDU Session Establishment Request contains a PDU Session Identity ("ID"), which identifies the second PDU Session, denoted here as "PDU Session ID-2".

At Step 1b, the AMF-1 222 sends a Session Management ("SM") Context Create Request message to the SMF-1 223 (see messaging 509) and, at Step 1c, normal PDU Session establishment procedure initiates in the 5GC of the second mobile communication network 310, e.g., as specified in 3GPP TS 23.502 (see block 511). At Step 1d, the SMF-1 223 sends a N1N2 Message Transfer to the AMF-1 222 (sec messaging 513).

At Step 2, as part of the second PDU Session Establishment procedure, the N3IWF 221 receives a PDU Session Resource Setup Request message from the AMF-1 222 (sec messaging 515), requesting the N3IWF 221 to reserve access resources to support (e.g.) two QoS flows: One Guaranteed Bit Rate ("GBR") QoS flow, identified by QFI-1, and one non-GBR QoS flow, identified by QFI-2. Each of the two QoS flows is associated with a set of QoS parameters that designate the QoS requirements for the QoS flow, e.g., the packet delay budget ("PDB") and the packet error rate ("PER"). For the GBR QoS flow, the QoS parameters also include the GBR QoS Flow Info, which contains the required maximum and guaranteed flow bit rates.

The 5GC in the second mobile communication network 310 (e.g., PLMN) determines the number of QoS flows and the QoS parameters of each QoS flow on the second PDU Session based on subscription information of the UE 205, pre-configured policies of the second mobile communication network 310, etc.

At Step 3, to reserve the appropriate access resources, the N3IWF 221 decides to establish two IPsec child SAs with the UE 205 (see block 517). Here, a first IPsec child SA is to carry the traffic of the GBR flow, and a second IPsec child SA is to carry the traffic of the non-GBR flow.

Continuing on FIG. 5B, at Step 4 the N3IWF 221 sends to the UE 205 an IKEv2 Create Child SA Request to establish the first IPsec child SA for the GBR flow (see messaging 519). As specified in 3GPP TS 23.502, the IKEv2 Create Child SA Request includes several parameters associated with the requested IPsec child SA, e.g., an SPI assigned by the N3IWF 221 for the first IPsec child SA (here denoted as "SPI-i-1"), the PDU Session ID of the second PDU Session (PDU Session ID-2), the Differentiated Services Code Point ("DSCP"), the QoS Flow ID ("QFI") of the GBR flow, the Additional QoS Information, etc. The Additional QoS Information contains parameters that define the QoS requirements of the first IPsec child SA, including the packet delay budget, the packet error rate, the maximum and guaranteed flow rates, etc.

In one example, the Additional QoS Information includes:

QoS characteristics:
        Resource type=GBR
        Priority=8
        Packet Delay Budget=20 ms
        Packet Error Rate=$10^-3$
        Averaging Window=1000 ms
    GBR QoS flow info:
        Maximum Flow Bit Rate downlink (MFBR downlink)=4 Mbps
        Maximum Flow Bit Rate uplink (MFBR uplink)=512 Kbps
        Guaranteed Flow Bit Rate downlink (GFBR downlink)=1 Mbps
        Guaranteed Flow Bit Rate uplink (GFBR uplink)=256 Kbps At Step 5, the UE 205 decides to request a new QoS flow on the first PDU Session in order to transfer the traffic of the first IPsec child SA because the UE 205 determines that none of the existing QoS flows on the first PDU Session 405 is suitable to fulfill the QoS requirements of the first IPsec child SA as expressed by the Additional QoS information (see block 521).

At Step 6, to establish a new QoS flow on the first PDU Session, the UE 205 initiates the UE-initiated PDU Session Modification procedure 523 with the first mobile communication network 305. The UE 205 provides to the AMF-0 216 (and SMF-0 217) a PDU session ID, which identifies the first PDU Session (here denoted as "PDU Session ID-1"), and the Requested QoS rules element that describes the data traffic which will be carried over the first IPsec child SA (see messaging 525). In addition, the UE 205 provides to the AMF-0 216 (and SMF-0 217) the Requested QoS flow descriptions element that describes the QoS requirements of the traffic which will be carried over the first IPsec child SA. In one example, the UE 205 provides the following Requested QoS rules element and Requested QoS flow descriptions element to first mobile communication network 305:

Requested QoS rules
  QoS Rule 1
    QoS Rule identifier=no identifier assigned
    Operation=Create new QoS Rule
    Packet filter 1
      Direction: Uplink only
      Component 1
        Component type=SPI
        Component value=0x01AB33F4 (i.e., SPI-r)
      Component 2
        Component type=IPv4 remote address
        Component value=10.11.12.13 (i.e., N3IWF address)
    Packet filter 2
      Direction: Downlink only
      Component 1
        Component type=SPI
        Component value=0x618AD2E7 (i.e., SPI-i)
      Component 2
        Component type=IPv4 local address
        Component value=10.11.12.13 (i.e., N3IWF address)
    Segregation requested
    QFI=no QFI assigned
Requested QoS flow descriptions
  QoS flow description 1
    QFI=no QFI assigned
    Operation=Create new QoS flow description
    Parameters list
      Parameter 1: GFBR UL=256 Kbps
      Parameter 2: GFBR DL=1 Mbps
      Parameter 3: MFBR UL=512 Kbps
      Parameter 4: MFBR DL=4 Mbps
      Parameter 5: Averaging Window=1000 ms Note that the UE 205 derives the elements included in the PDU Session Modification Request sent to the first mobile communication network 305 by using the parameters received in step 4 from the N3IWF 221, e.g., the SPI-i-1 and the Additional QoS Information-1. In addition, the UE 205 provides the SPI-r-1 which is assigned by the UE 205 to the first IPsec child SA. As used herein, the label "SPI-i" is used to indicate a network-assigned SPI (e.g., assigned by the N3IWF 221), while the label "SPI-r" is used to indicate a UE-assigned SPI.

If the first mobile communication network 305 (e.g., NPN) accepts the PDU Session modification requested by the UE 205, the UPF-0 218, the AMF-0 216, the SMF-0 217 and the PCF-0 503 modify the first PDU session 405 and reserve resources to support QoS requirements of the second IPsec child SA (see block 527). Via the AMF-0 216, the SMF-0 217 responds to the UE 205 with a PDU Session Modification Command including the Authorized QoS rules element and the Authorized QoS flow descriptions element, which are essentially the same as the Requested QoS rules element and the Requested QoS flow descriptions element provided by the UE 205, respectively, except that they include a specific QFI value assigned by the first mobile communication network 305 for the newly created QoS flow (referred to as QoS flow 3) (see messaging 529). The UE 205 acknowledges the PDU Session Modification Command by sending a PDU Session Modification Complete message (see messaging 531).

At Step 7, after successfully reserving resources on the first PDU Session in the first mobile communication network 305 to support the QoS requirements of the first IPsec child SA of the second PDU Session, the UE 205 sends an IKEv2 Create Child SA Response to N3IWF 221 including its own SPI for the first IPsec child SA (here denoted as "SPI-r-1"), which completes the establishment of the first IPsec child SA (sec messaging 533).

Continuing on FIG. 5C, because in step 3 the N3IWF 221 decided to establish two IPsec child SAs for the second PDU Session, then the steps similar to steps 4-7 are executed again for the establishment of the second IPsec child SA and the associated resources on the first PDU Session. As a result, another new QoS flow is created on the first PDU Session (referred to as QoS flow 4) to support the QoS requirements of the second IPsec child SA.

At Step 8, the N3IWF 221 sends to the UE 205 an IKEv2 Create Child SA Request to establish the second IPsec child SA for the non-GBR flow (see messaging 535). Again, the IKEv2 Create Child SA Request includes several parameters associated with the requested IPsec child SA, e.g., an SPI assigned by the N3IWF 221 for the second IPsec child SA (here denoted as "SPI-i-2"), the PDU Session ID of the second PDU Session (i.e., PDU Session ID-2), the DSCP, the QFI of the non-GBR flow, the Additional QoS Information, etc. The Additional QoS Information contains parameters that define the QoS requirements of the second IPsec child SA (non-GBR), including the packet delay budget ("PDB"), the packet error rate ("PER"), etc. Note, however, that since the second IPsec child SA carries the traffic of a non-GBR flow, the Additional QoS Information contains only the QoS characteristics component and does not contain a GBR QoS flow info component.

At Step 9, the UE 205 decides to request a new QoS flow on the second PDU Session in order to transfer the traffic of the second IPsec child SA, i.e., because the UE 205 determines that none of the existing QoS flows on the first PDU Session 405 is suitable to fulfill the QoS requirements of the second IPsec child SA as expressed by the Additional QoS information (see block 537).

At Step 10, to establish a new QoS flow on the first PDU Session, the UE 205 initiates the UE-initiated PDU Session Modification procedure 539 with the first mobile communication network 305 (e.g., NPN). The UE 205 provides to the AMF-0 216 (and SMF-0 217) a PDU session ID, which identifies the first PDU Session (i.e., PDU Session ID-1), and the Requested QoS rules element that describes the data traffic which will be carried over the second IPsec child SA (see messaging 541). Additionally, the UE 205 provides to the AMF-0 216 (and SMF-0 217) the Requested QoS flow descriptions element that describes the QoS requirements of the traffic which will be carried over the second IPsec child SA.

If the first mobile communication network 305 accepts the PDU Session modification requested by the UE 205, the UPF-0 218, the AMF-0 216, the SMF-0 217 and the PCF-0 503 modify the first PDU session 405 and reserve resources to support QoS requirements of the second IPsec child SA (see block 543). The SMF-0 217 sends to the UE 205, via the AMF-0 216, a PDU Session Modification Command containing PDU Session ID, Authorized QoS Rules, and Authorized QoS Flow Descriptions (see signaling 545). The UE 205 acknowledges the PDU Session modification command by sending a PDU Session modification complete message (see messaging 547).

Note that Steps 6 and 10 (the UE-initiated PDU Session Modification) are needed even if the UE 205 determines that the traffic of a requested IPsec child SA can be mapped to an existing QoS flow, i.e., when there is no need to establish a new QoS flow to support the first IPsec child SA and/or the second IPsec child SA. In this case, the UE 205 sends a PDU Session Modification Request including a Requested QoS rules information element ("IE") indicating "modify existing QoS rule and add packet filters" and will include the packet filters identifying the traffic of the first IPsec child SA and/or the second IPsec child SA.

At Step 11, after successfully reserving resources on the first PDU Session in first mobile communication network 305 to support the QoS requirements of the second IPsec child SA (i.e., for non-GBE flow) of the second PDU Session, the UE 205 sends an IKEv2 Create Child SA Response to N3IWF 221 including its own SPI for the second IPsec child SA (here denoted as "SPI-r-2"), which completes the establishment of the second IPsec child SA (see messaging 549).

At Step 12, the N3IWF 221 responds to AMF-1 222 with a PDU Session Resource Setup Response indicating that the access resources for the second PDU Session are reserved (see messaging 551). At this point, the data traffic of the second PDU Session can be communicated between the UE 205 and UPF-1 224, via the first PDU Session. Note that the data traffic of the second PDU Session is composed of the data traffic of the first IPsec child SA and the data traffic of the second IPsec child SA. The traffic of the first IPsec child SA is transferred on the QoS flow 3 (created in step 6) of the first PDU Session and the data traffic of the second IPsec child SA is transferred on the QoS flow 4 (created in step 10) of the first PDU Session.

By using the procedure 500, the UE 205 ensures that the traffic of the two IPsec child SAs (second data connection and third data connection) of the second PDU Session is transferred via the first PDU Session (first data connection) by receiving the appropriate QoS handling. This enables the UE 205 to establish a PDU Session with the second mobile communication network 310 (e.g., PLMN), via the first mobile communication network 305 (e.g., NPN), which can receive the expected QoS handling.

Figure 6:
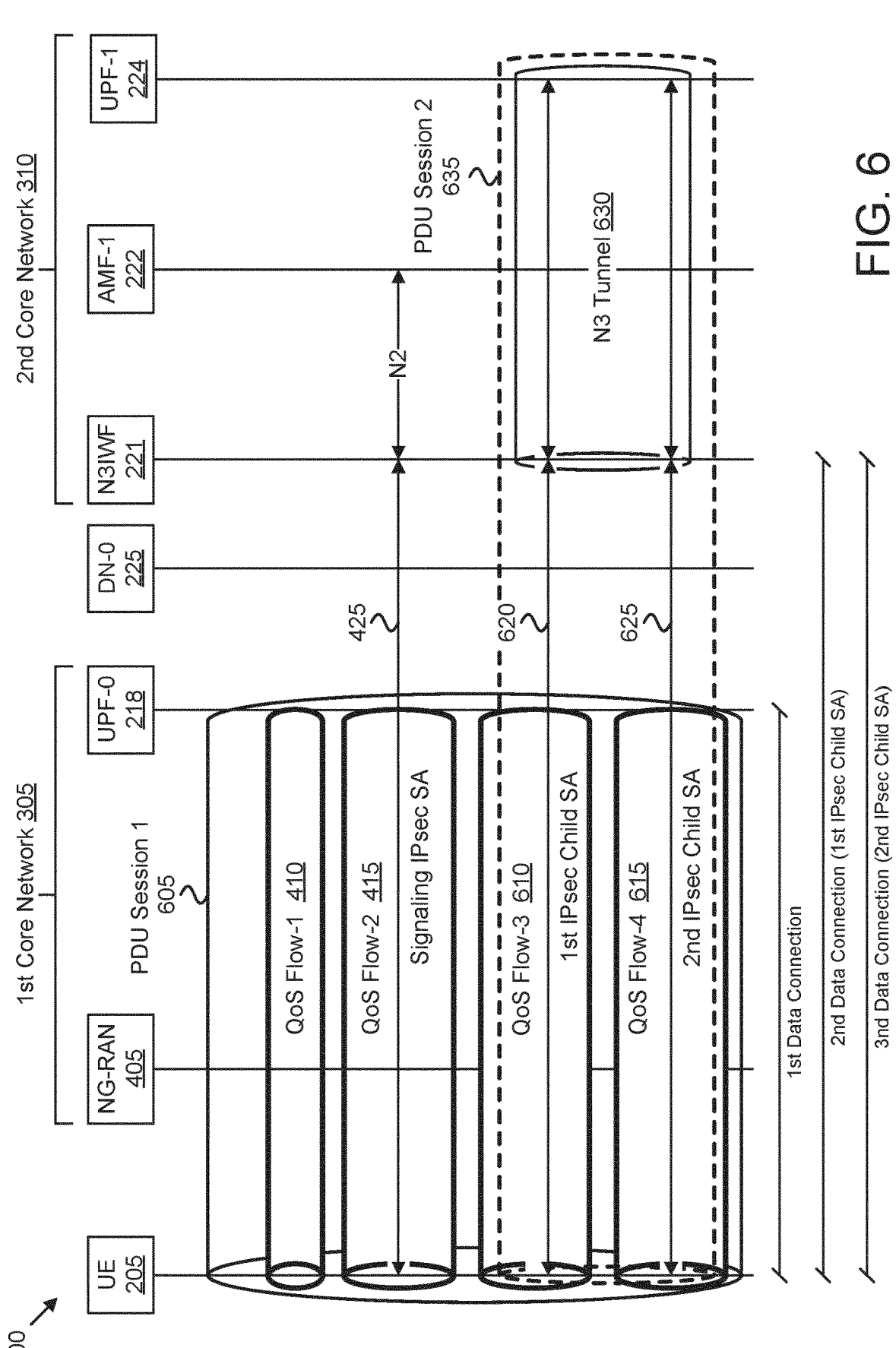
FIG. 6 is a diagram illustrating a first data connection that has been modified to support a second data connection.

FIG. 6 depicts a scenario 600 where a first data connection has been modified to support establishment of a second data connection, e.g., according to the procedure described above with reference to FIGS. 5A-5C. Here, it is assumed that a modified first data connection 605 (i.e., modified first PDU session) initially included the first QoS flow 410 and the second QoS flow 415, but that UE 205 determined that new QoS flows were needed to support IPsec child SAs for a second PDU Session 635 established with the second mobile communication network 310 via the first PDU session.

In the depicted example, the UE 205 has created two new QoS flows to support the second PDU session 635, specifically: a third QoS flow ("QoS Flow-3") 610 and a fourth QoS flow ("QoS Flow-2") 615. The third QoS flow 610 is used to transfer data traffic of a first IPsec Child SA 620 (e.g., a GBR flow), while the fourth QoS flow 615 is to be used to transfer data traffic of a second IPsec Child SA 625 (e.g., a non-GBR flow). Note that the second QoS flow 415 supports the signaling Internet Protocol Security ("IPsec") security association ("SA") 425 with the N3IWF 221 via the DN-0 225. Further note that the N3IWF 221 terminates the first and second IPsec child SAs 620, 625 and uses an N3 tunnel established with the UPF-1 224 in the second mobile communication network 310 to carry data traffic of the second PDU session 635, which includes both the data traffic of the first IPsec child SA 620 and the data traffic of the second IPsec child SA 625.

In FIG. 6, the first data connection corresponds to the first PDU Session 605, the second data connection corresponds to the first IPsec child SA 620 between the UE and N3IWF (not to the second PDU Session), and the third data connection corresponds to the second IPsec child SA 625 between the UE and N3IWF (not to the second PDU Session).

Figure 7:
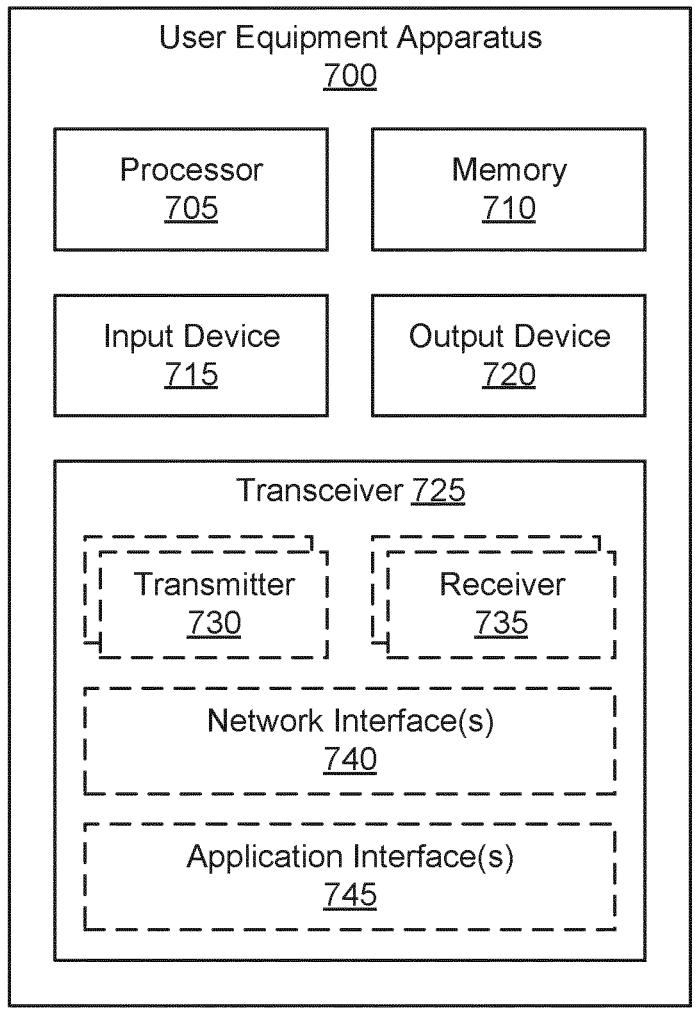
FIG. 7 is a block diagram illustrating one embodiment of a user equipment apparatus that may be used for modifying a first data connection during the establishment of a second data connection.

FIG. 7 depicts a user equipment apparatus 700 that may be used for modifying a first data connection during the establishment of a second data connection, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panel supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 controls the user equipment apparatus 700 to implement the above described UE behaviors. For example, the processor 705 may receive a first request (e.g., IKE Create Child SA request) via a first data connection (e.g., PDU Session 1) with a first mobile communication network over a first access network, the first data connection supporting a plurality of quality of service ("QoS") flows. The first request contains a first set of parameters (e.g., SPI, Additional QoS information) for establishing a second data connection (e.g., IPsec child SA) with an interworking function (e.g., N3IWF) in a second mobile communication network. Here, data traffic of the second data connection is to be transferred through the first data connection (e.g., IPsec child SA is transported inside the PDU Session 1).

In some embodiments, the first mobile communication network includes a non-public network ("NPN"), and the second mobile communication network includes a public land mobile network ("PLMN"). In other embodiments, the first mobile communication network includes a PLMN and the second mobile communication network includes an NPN.

Via the transceiver 725, the processor 705 sends a second request (e.g., PDU Session Modification Request) to modify the first data connection in response to receiving the first request, the second request containing a second set of parameters (e.g., Requested QoS Rules, Requested QoS flow descriptions) derived from the first set of parameters (e.g., SPI, Additional QoS information), wherein the second set of parameters modify the first data connection for supporting the data traffic of the second data connection. Via the transceiver 725, the processor 705 transmits the data traffic of the second data connection through the modified first data connection.

As used herein, modifying the first data connection means either (a) add a new QoS flow to the first data connection that is suitable to carry the data traffic of the second data connection, or (b) indicate an existing QoS flow of the first data connection that is suitable to carry the data traffic of the second data connection. The user equipment apparatus 700 decides option (a) when it determines that none of the existing QoS flows can support the required QoS of the second data connection, as indicated by the "Additional QoS Information" in the first request.

In some embodiments, the second set of parameters indicate to establish a new QoS flow over the first data connection. Here, the new QoS flow is to carry the data traffic of the second data connection. In such embodiments, the second set of parameters indicate to establish a new QoS flow over the first data connection in response to determining that none of the existing QoS flows over the first data connection is suitable to carry the data traffic of the second data connection. Note that a QoS flow is not suitable to carry the data traffic of the second data connection when the QoS provided by this QoS flow cannot provide the QoS required by the Additional QoS information. In certain embodiments, the second set of parameters includes packet filters (e.g., IP address of N3IWF and SPI) identifying the data traffic of the second data connection.

In some embodiments, the second set of parameters indicate an existing QoS flow of the first data connection. Here, the existing QoS flow is to carry the data traffic of the second data connection. In certain embodiments, the second set of parameters includes packet filters (e.g., IP address of N3IWF and SPI) identifying the data traffic of the second data connection.

In some embodiments, the second data connection includes an Internet Protocol Security ("IPsec") child security association ("SA"), wherein first set of parameters includes a security parameter index ("SPI") and additional QoS information for the IPsec child SA. In certain embodiments, the second set of parameters includes requested QoS rules and requested QoS flow descriptions for modifying the first data connection to support the data traffic of the IPsec child SA. Note that the requested QoS flow description is needed only when the IPsec child SA carries Guaranteed Bit-Rate ("GBR") traffic.

In some embodiments, the first request is an Internet Key Exchange ("IKE") Create Child SA request received from a non-3GPP interworking function ("N3IWF"). In such embodiments, the processor 705 further sends an IKE Create Child SA response message to the N3IWF in response to successfully modifying the first data connection and prior to transmitting the data traffic of the second data connection through the modified first data connection. In some embodiments, the first request (e.g., IKE Create Child SA request) is received in response to transmitting a PDU session establishment request via the first data connection, requesting the establishment of a PDU session in the second mobile communication network via the interworking function in the second mobile communication network. Note that the PDU session in the second mobile communication network may be composed of one or more child IPsec SAs, e.g., a second data connection, a third data connection, etc.

In some further embodiments, the processor 705 receives a third request (e.g., a second IKE Create Child SA request) via the first data connection, the third request containing a third set of parameters (e.g., SPI-2, Additional QoS information-2) for establishing a third data connection (e.g., IPsec Child SA-2) with the interworking function. Here, data traffic of the third data connection is to be transferred through the first data connection (e.g., IPsec Child SA-2 is also transported inside PDU session-1), where the second data connection and the third data connection form a PDU session with the second mobile communication network.

In one embodiment, the processor 705 sends a fourth request (e.g., PDU Session Modification Request) to establish a new QoS flow over the first data connection in response to receiving the third request. In another embodiment, the processor 705 sends a fourth request (e.g., PDU Session Modification Request) to indicate an existing QoS flow of the first data connection that is to carry the data traffic of the third data connection, in response to receiving the third request. In either embodiment, the fourth request contains a fourth set of parameters (e.g., Request QoS Rules, Requested QoS flow descriptions) derived from the third set of parameters. Via the transceiver 725, the processor 705 transmits the data traffic of the third data connection through either the new QoS flow of the first data connection or the indicated existing QoS flow of the first data connection.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to modifying a first data connection during the establishment of a second data connection. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
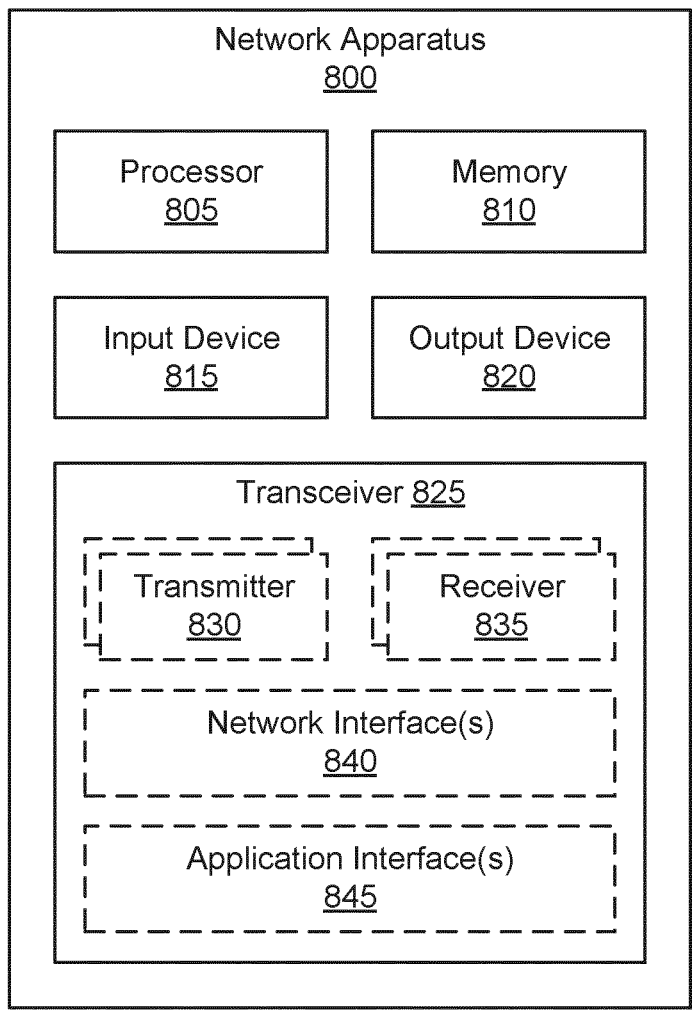
FIG. 8 is a block diagram illustrating one embodiment of a network apparatus that may be used for modifying a first data connection during the establishment of a second data connection.

FIG. 8 depicts a network apparatus 800 that may be used for modifying a first data connection during the establishment of a second data connection, according to embodiments of the disclosure. In one embodiment, network apparatus 800 may be one implementation of a RAN node, such as the base unit 121, the RAN node 210, or gNB, described above. Furthermore, the base network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that sends UE configurations and receives measurement reports, as described herein. In such embodiments, the processor 805 controls the network apparatus 800 to perform the above described behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the network apparatus 800 is a gateway function and/or interworking function, such as the N3IWF 142 and/or N3IWF 221, described above. In such embodiments, the processor 805 may control the network interface 840 to send and receive messages between the UE and core NFs in the second mobile communication network 310 (i.e., via a PDU session or other data connection with the first mobile communication network 305). Additionally, the processor 805 may process PDU session establishment messages exchanged between the UE and core NFs in the second mobile communication network 310 and determine a number of IPsec Child SAs to establish for the PDU session established with the second mobile communication network 310, as described above.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to modifying a first data connection during the establishment of a second data connection. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the NPN, PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

FIG. 9 depicts one embodiment of a method 900 for modifying a first data connection during the establishment of a second data connection, according to embodiments of the disclosure. In various embodiments, the method 900 is performed by a user equipment device in a mobile communication network, such as the remote unit 105, the UE 205, and/or the user equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a first request (i.e., an IKE Create Child SA request) via a first data connection (i.e., via PDU Session-1) with a first mobile communication network (i.e., mobile core network 130, NPN 215 and/or first network 305), the first data connection supporting a plurality of QoS flows. Here, the first request containing a first set of parameters (i.e., SPI, Additional QoS information) for establishing a second data connection (i.e., an IPsec child SA) with an interworking function (i.e., the N3IWF 142 and/or N3IWF 221) in a second mobile communication network (i.e., mobile core network 140, PLMN 220 and/or second network 310), where data traffic of the second data connection is to be transferred through the first data connection (i.e., the IPsec child SA is transported inside the PDU Session-1).

The method 900 includes sending 910 a second request (i.e., PDU Session Modification Request) to modify the first data connection in response to receiving the first request. Here, the second request containing a second set of parameters (i.e., Request QoS Rules, Requested QoS flow descriptions) derived from the first set of parameters (i.e., SPI, Additional QoS information), where the second set of parameters modify the first data connection for supporting the data traffic of the second data connection. The method 900 includes transmitting 915 the data traffic of the second data connection through the modified first data connection. The method 900 ends.

Disclosed herein is a first apparatus for modifying a first data connection during the establishment of a second data connection, according to embodiments of the disclosure. The first apparatus may be implemented by a user equipment device in a mobile communication network, such as the remote unit 105, the UE 205, and/or the user equipment apparatus 700, described above. The first apparatus includes a processor and a transceiver that supports a first data connection (e.g., a first PDU Session) with a first mobile communication network over a first access network, the first data connection supporting a plurality of quality of service ("QoS") flows. The processor receives a first request (e.g., IKE Create Child SA request) via the first data connection, the first request containing a first set of parameters (e.g., SPI, Additional QoS information) for establishing a second data connection (e.g., IPsec child SA) with an interworking function (e.g., N3IWF) in a second mobile communication network. Here, data traffic of the second data connection is to be transferred through the first data connection (e.g., IPsec child SA is transported inside the first PDU Session). Via the transceiver, the processor sends a second request (e.g., PDU Session Modification Request) to modify the first data connection in response to receiving the first request, the second request containing a second set of parameters (e.g., Requested QoS Rules, Requested QoS flow descriptions) derived from the first set of parameters (e.g., SPI, Additional QoS information), wherein the second set of parameters modify the first data connection for supporting the data traffic of the second data connection and transmits the data traffic of the second data connection through the modified first data connection.

In some embodiments, the second set of parameters indicate to establish a new QoS flow over the first data connection. Here, the new QoS flow is to carry the data traffic of the second data connection. In such embodiments, the second set of parameters indicate to establish a new QoS flow over the first data connection in response to determining that none of the existing QoS flows over the first data connection is suitable to carry the data traffic of the second data connection. In certain embodiments, the second set of parameters includes packet filters (e.g., IP address of N3IWF and SPI) identifying the data traffic of the second data connection.

In some embodiments, the second set of parameters indicate an existing QoS flow of the first data connection. Here, the existing QoS flow is to carry the data traffic of the second data connection. In certain embodiments, the second set of parameters includes packet filters (e.g., IP address of N3IWF and SPI) identifying the data traffic of the second data connection.

In some embodiments, the second data connection includes an Internet Protocol Security ("IPsec") child security association ("SA"), wherein first set of parameters includes a security parameter index ("SPI") and additional QoS information for the IPsec child SA. In certain embodiments, the second set of parameters includes requested QoS rules and requested QoS flow descriptions for modifying the first data connection to support the data traffic of the IPsec child SA. In some embodiments, the first mobile communication network includes a non-public network ("NPN"), and the second mobile communication network includes a public land mobile network ("PLMN"). In other embodiments, the first mobile communication network includes a PLMN, and the second mobile communication network includes an NPN.

In some embodiments, the first request is an Internet Key Exchange ("IKE") Create Child SA request received from a non-3GPP interworking function ("N3IWF"). In such embodiments, the processor further sends an IKE Create Child SA response message to N3IWF in response to successfully modifying the first data connection and prior to transmitting the data traffic of the second data connection through the modified first data connection. In some embodiments, the first request (e.g., IKE Create Child SA request) is received in response to transmitting a PDU session establishment request via the first data connection, requesting the establishment of a PDU session in the second mobile communication network via the interworking function in the second mobile communication network.

In some further embodiments, the processor receives a third request (e.g., a second IKE Create Child SA request) via the first data connection, the third request containing a third set of parameters (e.g., SPI-2. Additional QoS information-2) for establishing a third data connection (e.g., IPsec Child SA-2) with the interworking function. Here, data traffic of the third data connection is to be transferred through the first data connection (e.g., IPsec child SA-2 is also transported inside PDU session-1), where the second data connection and the third data connection form a PDU session with the second mobile communication network. In such embodiments, the processor sends a fourth request (e.g., PDU Session Modification Request) to establish a new QoS flow over the first data connection in response to receiving the third request and transmits the data traffic of the third data connection through the new QoS flow of the first data connection, where the fourth request contains a fourth set of parameters (e.g., Request QoS Rules, Requested QoS flow descriptions) derived from the third set of parameters.

In some further embodiments, the processor receives a third request (e.g., IKE Create Child SA request) via the first data connection, the third request containing a third set of parameters for establishing a third data connection (e.g., IPsec Child SA-2) with the interworking function. Here, data traffic of the third data connection is to be transferred through the first data connection (e.g., IPsec child SA-2 is also transported inside PDU session 1), wherein the second data connection and third data connection form a PDU session with the second mobile communication network. In such embodiments, the processor sends a fourth request (e.g., PDU Session Modification Request) to indicate an existing QoS flow of the first data connection that is to carry the data traffic of the third data connection, in response to receiving the third request and transmits the data traffic of the third data connection through the indicated existing QoS flow of the first data connection, where the fourth request contains a fourth set of parameters (e.g., Request QoS Rules, Requested QoS flow descriptions) derived from the third set of parameters.

Disclosed herein is a first method for modifying a first data connection during the establishment of a second data connection, according to embodiments of the disclosure. The first method may be performed by a user equipment device in a mobile communication network, such as the remote unit 105, the UE 205, and/or the user equipment apparatus 700. The first method includes receiving a first request (e.g., an IKE Create Child SA request) via a first data connection (e.g., via PDU Session-1) with a first mobile communication network over a first access network, the first data connection supporting a plurality of QoS flows. Here, the first request containing a first set of parameters (e.g., SPI. Additional QoS information) for establishing a second data connection (e.g., an IPsec child SA) with an interworking function (e.g., the N3IWF 142) in a second mobile communication network, where data traffic of the second data connection is to be transferred through the first data connection (e.g., the IPsec child SA is transported inside the PDU Session-1). The first method includes sending a second request (e.g., PDU Session Modification Request) to modify the first data connection in response to receiving the first request. Here, the second request containing a second set of parameters (e.g., Request QoS Rules, Requested QoS flow descriptions) derived from the first set of parameters (e.g., SPI, Additional QoS information), where the second set of parameters modify the first data connection for supporting the data traffic of the second data connection. The first method includes transmitting the data traffic of the second data connection through the modified first data connection.

In some embodiments, the second set of parameters indicate to establish a new QoS flow over the first data connection, where the new QoS flow is to carry the data traffic of the second data connection. In such embodiments, the second set of parameters indicate to establish a new QoS flow over the first data connection in response to determining that none of the existing QoS flows over the first data connection is suitable to carry the data traffic of the second data connection. In certain embodiments, the second set of parameters includes packet filters (e.g., IP address of N3IWF and SPI) identifying the data traffic of the second data connection.

In some embodiments, the second set of parameters indicate an existing QoS flow of the first data connection, where the existing QoS flow is to carry the data traffic of the second data connection. In certain embodiments, the second set of parameters includes packet filters (e.g., IP address of N3IWF and SPI) identifying the data traffic of the second data connection.

In some embodiments, the second data connection includes an IPsec child SA, wherein first set of parameters includes a SPI and additional QoS information for the IPsec child SA. In certain embodiments, the second set of parameters includes requested QoS rules and requested QoS flow descriptions for the modifying the first data connection to support the data traffic of the IPsec child SA. In some embodiments, the first mobile communication network includes an NPN, and the second mobile communication network includes a PLMN. In other embodiments, the first mobile communication network includes a PLMN, and the second mobile communication network includes an NPN.

In some embodiments, the first request is an IKE Create Child SA request received from a N3IWF. In such embodiments, the first method may include sending an IKE Create Child SA response message to N3IWF in response to successfully modifying the first data connection and prior to transmitting the data traffic of the second data connection through the modified first data connection.

In some embodiments, the first request is received in response to transmitting a PDU session establishment request, via the first data connection, requesting the establishment of a PDU session in the second mobile communication network via the interworking function in the second mobile communication network.

In some embodiments, the first method further includes receiving a third request (e.g., a second IKE Create Child SA request) via the first data connection, the third request containing a third set of parameters (e.g., SPI-2, Additional QoS information-2) for establishing a third data connection (e.g., IPsec Child SA-2) with the interworking function. Here, data traffic of the third data connection is to be transferred through the first data connection (e.g., IPsec child SA-2 is also transported inside PDU session 1), where the second data connection and the third data connection form a PDU session with the second mobile communication network. In such embodiments, the first method further includes sending a fourth request (e.g., PDU Session Modification Request) to establish a new QoS flow over the first data connection in response to receiving the third request and transmitting the data traffic of the third data connection through the new QoS flow of the first data connection, where the fourth request contains a fourth set of parameters (e.g., Request QoS Rules, Requested QoS flow descriptions) derived from the third set of parameters.

In some embodiments, the first method further includes receiving a third request (e.g., IKE Create Child SA request) via the first data connection, the third request containing a third set of parameters (e.g., SPI-2, Additional QoS information-2) for establishing a third data connection (e.g., IPsec Child SA-2) with the interworking function. Here, data traffic of the third data connection is to be transferred through the first data connection (e.g., IPsec child SA-2 is also transported inside PDU session 1), where the second data connection and third data connection form a PDU session with the second mobile communication network. In such embodiments, the first method further includes sending a fourth request (e.g., PDU Session Modification Request) to indicate an existing QoS flow of the first data connection that is to carry the data traffic of the third data connection, in response to receiving the third request and transmitting the data traffic of the third data connection through the indicated existing QoS flow of the first data connection, where the fourth request contains a fourth set of parameters (e.g., Request QoS Rules, Requested QoS flow descriptions) derived from the third set of parameters.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication comprising:

at least one memory; and at least one processor coupled with the at least one memory and configured to cause the UE to:

receive a first request via a first data connection supporting a plurality of quality of service ("QoS") flows, the first request comprising a first set of parameters for establishing a second data connection with an interworking function, wherein data traffic of the second data connection is to be transferred through the first data connection;

transmit a second request to modify the first data connection in response to receiving the first request and in response to determining that none of the existing QoS flows over the first data connection is suitable to carry the data traffic of the second data connection, the second request comprising a second set of parameters derived from the first set of parameters, wherein the second set of parameters indicates to establish a new QoS flow over the first data connection; and transmit the data traffic of the second data connection through the modified first data connection.

2. The UE of claim 1, wherein the new QoS flow is to carry the data traffic of the second data connection.

3. The UE of claim 1, wherein the second set of parameters comprises packet filters identifying the data traffic of the second data connection.

4. The UE of claim 1, wherein the second data connection comprises an Internet Protocol Security ("IPsec") child security association ("SA"), wherein first set of parameters comprises a security parameter index ("SPI") and additional QoS information for the IPsec child SA.

5. The UE of claim 4, wherein the second set of parameters comprises requested QoS rules and requested QoS flow descriptions for modifying the first data connection to support the data traffic of the IPsec child SA.

6. The UE of claim 1, wherein the first data connection is established with a non-public network and the second data connection is established with a public land mobile network.

7. The UE of claim 1, wherein the first request is an Internet Key Exchange ("IKE") Create Child security association ("SA") request received from a non-3GPP interworking function ("N3IWF"), wherein the at least one processor is further configured to cause the UE to send an IKE Create Child SA response message to the N3IWF in response to a successful modification of the first data connection and prior to transmitting the data traffic of the second data connection through the modified first data connection.

8. The UE of claim 1, wherein the first data connection is established in a first mobile communication network and the interworking function is in a second mobile communication network, wherein the first request is received in response to transmitting a request, via the first data connection, to establish a PDU session in the second mobile communication network via the interworking function.

9. A method performed by a user equipment ("UE"), the method comprising:

receiving a first request via a first data connection, the first data connection supporting a plurality of quality of service ("QoS") flows, the first request comprising a first set of parameters for establishing a second data connection with an interworking function, wherein data traffic of the second data connection is to be transferred through the first data connection;

transmitting a second request to modify the first data connection in response to receiving the first request and in response to determining that none of the existing QoS flows over the first data connection is suitable to carry the data traffic of the second data connection, the second request comprising a second set of parameters derived from the first set of parameters, wherein the second set of parameters indicates to establish a new QoS flow over the first data connection; and transmitting the data traffic of the second data connection through the modified first data connection.

10. The method of claim 9, wherein the new QoS flow is to carry the data traffic of the second data connection.

11. The method of claim 9, wherein the second set of parameters comprises packet filters identifying the data traffic of the second data connection.

12. The method of claim 9, wherein the second data connection comprises an Internet Protocol Security ("IPsec") child security association ("SA"), wherein first set of parameters comprises a security parameter index ("SPI") and additional QoS information for the IPsec child SA.

13. The method of claim 12, wherein the second set of parameters comprises requested QoS rules and requested QoS flow descriptions for the modifying the first data connection to support the data traffic of the IPsec child SA.

14. The method of claim 9, wherein the first data connection is established with a non-public network and the second data connection is established with a public land mobile network.

15. The method of claim 9, wherein the first request is an Internet Key Exchange ("IKE") Create Child security association ("SA") request received from a non-3GPP interworking function ("N3IWF"), the method further comprising:

sending an IKE Create Child SA response message to the N3IWF in response to a successful modification of the first data connection and prior to transmitting the data traffic of the second data connection through the modified first data connection.

16. The method of claim 9, wherein the first data connection is established in a first mobile communication network and the interworking function is in a second mobile communication network, wherein the first request is received in response to transmitting a request, via the first data connection, to establish a PDU session in the second mobile communication network via the interworking function.

* * * * *